(12) United States Patent
Smit

(10) Patent No.: US 7,245,672 B2
(45) Date of Patent: Jul. 17, 2007

(54) METHOD AND APPARATUS FOR PHASE-DOMAIN SEMI-COHERENT DEMODULATION

(75) Inventor: Gerrit Smit, LW Hertme (NL)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 826 days.

(21) Appl. No.: 10/459,604

(22) Filed: Jun. 12, 2003

(65) Prior Publication Data

US 2004/0036528 A1 Feb. 26, 2004

Related U.S. Application Data

(60) Provisional application No. 60/392,112, filed on Jun. 27, 2002.

(51) Int. Cl.
 H03D 3/22 (2006.01)
 H04L 27/22 (2006.01)
(52) U.S. Cl. .................. 375/330; 375/340; 375/324; 329/304
(58) Field of Classification Search ............... 375/330, 375/331, 340, 324, 268, 326, 316; 329/304
See application file for complete search history.

(56) References Cited

U.S. PATENT DOCUMENTS

| 5,062,123 | A | 10/1991 | Geile et al. .................. 375/81 |
| 5,151,925 | A | 9/1992 | Gelin et al. |
| 5,255,290 | A | 10/1993 | Anvari |
| 5,434,889 | A | 7/1995 | Baier |
| 5,802,117 | A | 9/1998 | Ghosh |
| 6,181,751 | B1 * | 1/2001 | Sun ............................. 375/340 |
| 6,347,120 | B1 * | 2/2002 | Sakoda ....................... 375/259 |
| 6,347,126 | B1 | 2/2002 | Nagayasu et al. |
| 6,363,131 | B1 | 3/2002 | Beidas et al. |
| 6,389,040 | B1 | 5/2002 | Viswanathan |

(Continued)

FOREIGN PATENT DOCUMENTS

EP 0 671 837 A1 9/1995

(Continued)

OTHER PUBLICATIONS

B. K. Poh et al; "A High Data Rate MDPSK Receiver Architecture for Indoor Wireless Application"; IEEE, vol. 4, Sep. 15, 2002, pp. 1718-1721.

(Continued)

*Primary Examiner*—Phuong Phu
(74) *Attorney, Agent, or Firm*—Michael Cameron, Esq.

(57) ABSTRACT

A method and apparatus for phase-domain semi-coherent demodulator including a receiver for receiving at least a phase component of an input signal. The phase domain semi-coherent demodulator may include a decision unit for forming a decision based on a delayed reference signal and the phase component of the input signal. In addition the phase domain semi-coherent demodulator may include a phase sum adder for subtracting the decision from the phase component of the input signal to form a rotated input phase, a second phase sum adder for subtracting the delayed reference signal from the rotated input phase to form a resulting signal, and a scaler for scaling the resulting signal to form an update signal. A third phase sum adder adds the update signal to the delayed reference signal to form a reference signal.

16 Claims, 2 Drawing Sheets

U.S. PATENT DOCUMENTS

| | | | |
|---|---|---|---|
| 6,393,068 B1 | 5/2002 | Rupp | |
| 6,393,073 B1 | 5/2002 | Eilts | |
| 6,532,271 B1 * | 3/2003 | Hwang et al. | 375/326 |
| 6,625,231 B1 * | 9/2003 | Shen | 375/316 |
| 7,006,584 B1 * | 2/2006 | Nagashima | 375/324 |
| 2001/0031022 A1 | 10/2001 | Petrus et al. | 375/324 |
| 2002/0094048 A1 | 7/2002 | Simmons et al. | |

FOREIGN PATENT DOCUMENTS

| | | |
|---|---|---|
| WO | WO 02/37744 | 5/2002 |
| WO | WO 02/39688 | 5/2002 |
| WO | WO 2004/004268 | 1/2004 |

OTHER PUBLICATIONS

Data-Aided Noncoherent Demodulation of DPSK; by Harry Leib; IEEE Transactions on Communications, vol. 43, No. 2/3/4; Feb./Mar./Apr. 1995; pp. 722-724.

Digital Phase Modulation; by John B. Anderson et al.; Signal Analysis and an Overview of Modulation Methods; 3 Pages.

Fonollosa, J.R. et al., "Analysis of CPM Signals using Higher-Order Statistics", Military Communications Conference, 1993. Milcom 1993. Conference Record. Communications on the Move, IEEE Boston, MA, Oct. 11-14, 1993, New, NY, IEEE. (pp. 663-667).

Fonollosa, J.R. et al., "Estimation of the Modulation Index of CPM Signals Using Higher-Order Statistics", Statistical Signal and Array Processing, Minneapolis, Apr. 27-30, 1993, Proceedings of the International Conference on Acoustics, Speech, and Signal Processing, New York, IEEE, US, vol. 4, Apr. 27, 1993 (pp. 268-271).

Motorola's Bluetooth Solution to Interface Rejection and Coexistence with 802.11 by Weizhong Chen, Ph.D.; Copyright Motorola, Inc., 2001; 14 Pages.

Fractionally-Spaced Differential Detection of GFSK Signals with Small h* by Sukkyun Hong and Yong-Hwan Lee; IEICE Trans. Commun., vol. E-84-B, No. 12; Dec. 2001; 9 Pages.

Non Data Aided Estimation of the Modulation Index of Continuous Phase Modulations by Pascal Bianchi, Philippe Loubaton and Francois Sirven; Jan. 28, 2003; 30 Pages.

Orozco Roura, C., Standard Search Report as prepared by European Patent Office, (4 pgs.).

Differential Detection with IIR Filter for Improving DPSK Detection Performance by Naokazu Hamamoto; IEEE Transactions on Communications, vol. 44, No. 8 (Aug. 1996); pp. 959-965.

* cited by examiner

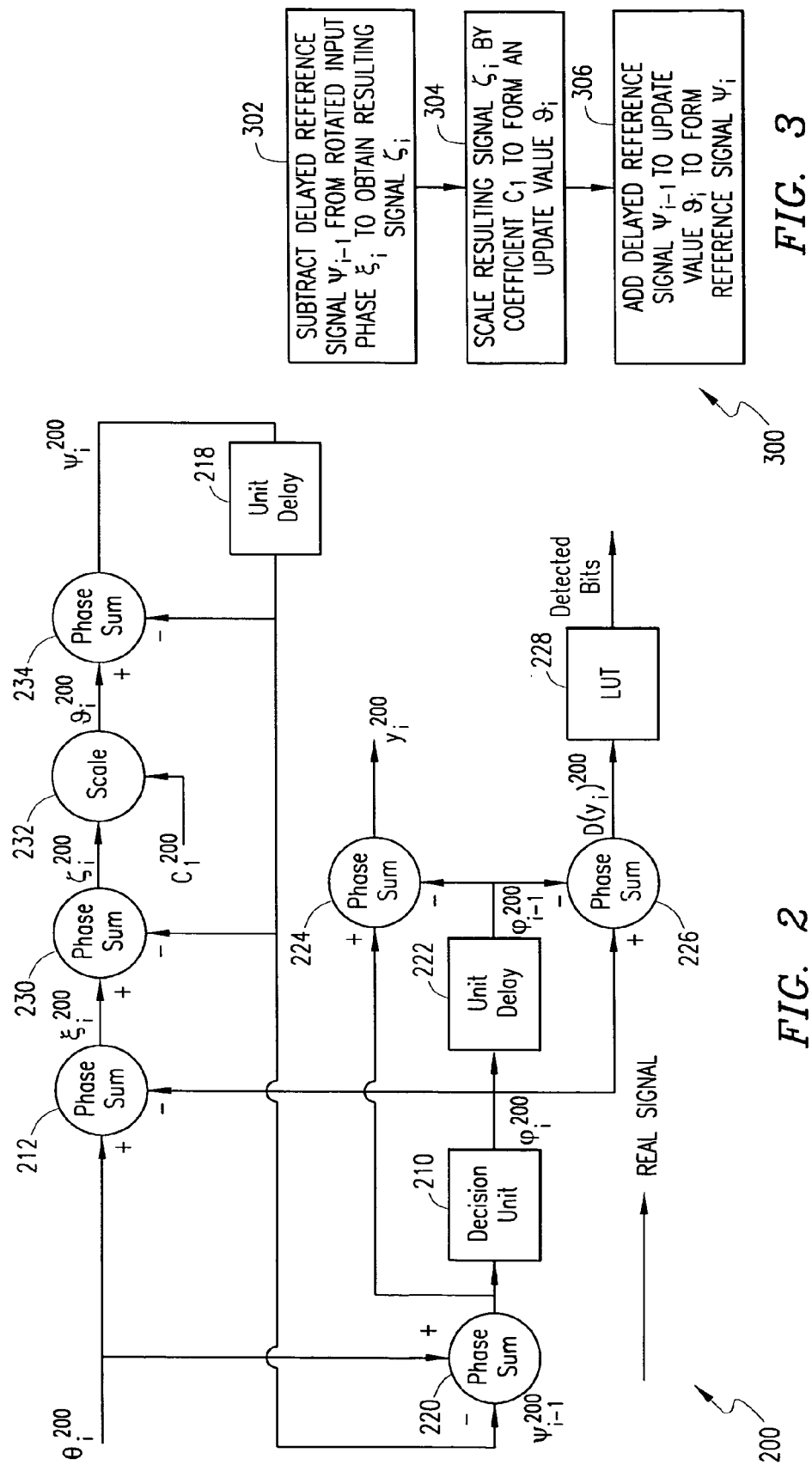

METHOD AND APPARATUS FOR PHASE-DOMAIN SEMI-COHERENT DEMODULATION

CROSS-REFERENCE TO RELATED APPLICATIONS

This patent application claims the benefit of priority from and incorporates by reference the entire disclosure of U.S. Provisional Patent Application No. 60/392,112, filed on Jun. 27, 2002.

BACKGROUND OF THE INVENTION

1. Technical Field of the Invention

The present invention relates generally to the field of wireless technology and, more particularly, to a method of and system for digital radio transceivers.

2. Description of Related Art

Wireless technologies such as, for example, terrestrial and satellite mobile communications and short-range wireless systems such as BLUETOOTH, often use M-ary differential encoded phase shift keying (MDPSK) for transmitting data. MDPSK is typically employed because of its advantageous characteristics, such as nonnecessity of carrier recovery circuits, fast acquisition performance, phase ambiguity resolution, and good performance over multipath fading channels.

A current solution for improving MDPSK detection performance utilizes a conventional differential detection circuit equipped with an infinite impulse response (IIR) filter combined with decision feedback. The carrier frequency offset typically generated in mobile communications is compensated for by a carrier frequency tracking loop. The semi-coherent demodulator approximates the performance of a coherent MDPSK demodulator without requiring carrier phase acquisition and tracking.

Referring now to FIG. 1, a known semi-coherent demodulator 100 is illustrated. In the FIGURES, the bold arrows indicate a complex signal and the thin arrow indicate a real signal. An input signal $x_i$ is received in complex form by the semi-coherent demodulator 100. The semi-coherent demodulator 100 manipulates the input signal $x_i$ into amplitude $A_i^{100}$ and phase $\theta_i^{100}$ components of a real signal via a magnitude calculator 104 and a phase calculator 106, respectively, according to the following equation:

$$x_i = A_i^{100} e^{j\theta_i^{100}} \quad i=1,2,3 \tag{1}$$

To create a reference signal $u_i^{100}$, an impact of modulation on the input signal $x_i$ is removed from Equation 1. The impact of the modulation may be removed by rotating the input signal $x_i$ by a delayed decision $\phi_{i-1}^{100}$ of a decision unit 110. The decision $\phi_i^{100}$ is based on a reference phase $\psi_i^{100}$ and the phase component $\theta_i^{100}$ described in more detail below. The rotation of the input signal $x_i$ is achieved by subtracting the output decision $\phi_i^{100}$ of the decision unit 110 from the phase component $\theta_i^{100}$ of the input signal $x_i$.

A phase sum adder 112 performs the subtraction of the decision $\phi_i^{100}$ from the phase component $\theta_i^{100}$ in order to yield a rotated input phase $\xi_i^{100}$. The rotated input phase $\xi_i^{100}$ is input along with the amplitude $A_i^{100}$ to a magnitude-and-phase-to-complex converter 114. The magnitude-and-phase-to-complex converter 114 outputs the reference signal $u_i^{100}$. The following equation holds true for the reference signal $u_i^{100}$:

$$u_i^{100} = A_i^{100} e^{j(\theta_i^{100} - \phi_i^{100})} \quad i=1,2,3 \tag{2}$$

The reference signal $u_i^{100}$ may remain disturbed by impairments such as noise and intersymbol interference (ISI). The impairments may be averaged out by integration at an integrator 108. The integrator 108 operates in the complex domain in order to ensure that the amplitude $A_i^{100}$ of the semi-coherent demodulator 100 is considered. A coherency parameter $\alpha$ is input with the reference signal $u_i^{100}$ to form the output of the integrator 108, a reference vector $r_i^{100}$. Many approaches may be employed to integrate the reference signal $u_i^{100}$. In an embodiment of the invention, an exponential integration window yields the following equation:

$$r_i^{100} = \alpha * r_{i-1}^{100} + (1-\alpha) * u_i^{100} \quad i=1,2,3 \tag{3}$$

The reference vector $r_i^{100}$ is input to a complex-to-phase converter 116. A reference phase $\psi_i^{100}$ is output from the complex-to-phase converter 116 to a unit delay 118.

As noted above, in order to remove the impact of the modulation, a tentative decision is made at the decision unit 110 about a transmitted symbol of the input signal $x_i$. The tentative decision is input to the phase sum adder 112. The decision $\phi_i^{100}$, which is made at the decision unit 110, is based upon a phase difference between the actual input phase component $\theta_i^{100}$ and a previous reference phase $\psi_{i-1}^{100}$. The previous reference phase $\psi_{i-1}^{100}$ is output from the unit delay 118. The unit delay 118 receives as an input the reference phase $\psi_i^{100}$ from the complex-to-phase converter 116. The phase difference between the actual input phase component $\theta_i^{100}$ and the previous reference phase $\psi_{i-1}^{100}$ is calculated by a second phase sum adder 120 and input to the decision unit 110.

The function of the decision unit 110 is dependent on the number of modulation levels M. For example, for M=2, the following equation is true:

$$\varphi_i^{100} = \begin{cases} \pi & \text{if} |\theta_i^{100} - \psi_{i-1}^{100}| \geq \dfrac{\pi}{2} \\ 0 & \text{elsewhere} \end{cases} \tag{4}$$

The decision $\phi_i^{100}$ is input to a second unit delay 122. A delayed decision $\phi_{i-1}^{100}$ output by the second unit delay 122 is then input to a phase sum adder 124 and a phase sum adder 126. The first additional phase sum adder 124 subtracts the delayed decision $\phi_{i-1}^{100}$ from the output of the phase sum adder 120. The output of the phase sum adder 124 is an output $y_i^{100}$ of the semi-coherent demodulator 100.

A previous phase difference $\theta_{i-1}^{100}$ is replaced with a corrected previous phase difference $\gamma_{i-1}^{100}$. The corrected previous phase difference $\gamma_{i-1}^{100}$ includes less noise than the previous phase difference $\theta_{i-1}^{100}$. The corrected previous phase difference $\gamma_{i-1}^{100}$ is denoted by:

$$\gamma_{i-1}^{100} = \psi_{i-1}^{100} + \phi_{i-1}^{100} \quad i=2,3 \tag{5}$$

The output $y_i^{100}$ of the semi-coherent demodulator 100, and thus also the output of phase sum adder 124, is given by the following equation:

$$y_i^{100} = \theta_i^{100} - \gamma_{i-1}^{100} \quad i=2,3 \tag{6}$$

The phase sum adder 126 subtracts the delayed decision $\phi_{i-1}^{100}$ from the decision $\phi_i^{100}$ to produce a decision of the output $D(y_i^{100})$. The decision $D(y_i^{100})$ is input to a look-up table (LUT) 128 to output detected bits.

Calculations in both the phase and complex domains increase computational complexity. Phase-to-complex converters, complex-to-phase converters, integrators, etc. are needed to perform the necessary additional calculations. The additional computations result in excessive power consumption and silicon area in order to achieve the increased performance of the MDPSK semi-coherent demodulator 100.

SUMMARY OF THE INVENTION

These and other drawbacks are overcome by embodiments of the present invention, which provide a phase domain semi-coherent demodulator. Embodiments of the invention may not require a perfect carrier frequency synchronization between a transmitter and receiver in a communications system. Embodiments of the present invention also reduce complexity by performing calculations in the phase domain rather than the complex domain. The phase domain semi-coherent demodulator includes a receiver for receiving at least a phase component of an input signal. The phase domain semi-coherent demodulator may include a decision unit for forming a decision based on a delayed reference signal and the phase component of the input signal. In addition the phase domain semi-coherent demodulator may include a phase sum adder, which may operate in modulo $2\pi$ addition, for subtracting the decision from the phase component of the input signal to form a rotated input phase, a second phase sum adder for subtracting the delayed reference signal from the rotated input phase to form a resulting signal, and a scaler for scaling the resulting signal to form an update signal. A third phase sum adder adds the update signal to the delayed reference signal to form a reference signal.

In another aspect of the present invention, a method calculates information in the phase domain for a semi-coherent demodulator. The method includes receiving at least a phase component of an input signal and forming, by a decision unit, of a decision value based on a delayed reference signal and the phase component of the input signal. The method may include subtracting the decision value from the phase component of the input signal to form a rotated input phase and subtracting the delayed reference signal from the rotated input phase to form a resulting signal. The resulting signal may be scaled to form an update signal. The update signal may be added to the delayed reference signal to form a reference signal.

In another aspect, the present invention relates to an article of manufacture for phase-domain semi-coherent demodulation of an input signal. The article of manufacture includes at least one computer readable medium and processor instruction contained on the at least one computer readable medium. The processor instructions are configured to be readable from the at least one computer readable medium by at least one processor and thereby cause the at least one processor to operate as to receive at least a phase component of an input signal and form, by a decision unit, a decision value based on a delayed reference signal and the phase component of the input signal. The decision may be subtracted from the phase component of the input signal to form a rotated input phase. The delayed reference signal is subtracted from the rotated input phase to form a resulting signal. The resulting signal is scaled to form an update signal. The update signal is added to the delayed reference signal to form a reference signal.

BRIEF DESCRIPTION OF THE DRAWINGS

Further advantages and specific details of the present invention will become apparent hereinafter from the detailed description given below in conjunction with the following drawings.

FIG. 2 is a block diagram of a phase domain semi-coherent demodulator in accordance with principles of the present invention; and FIG. 3 is a flow diagram of a method of calculating the reference phase in the phase domain.

DETAILED DESCRIPTION OF THE EXEMPLARY EMBODIMENTS OF THE INVENTION

Figure 1:
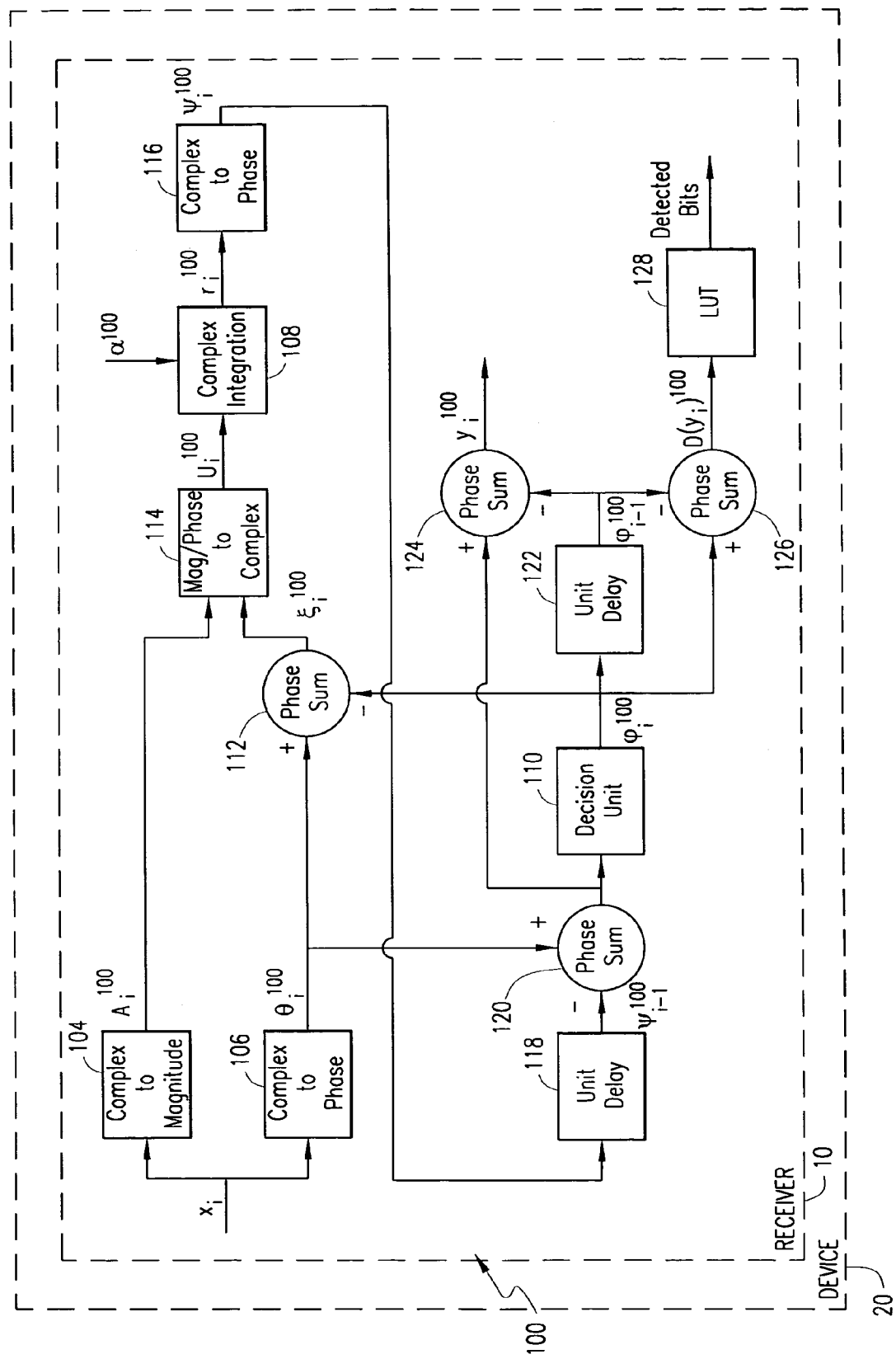
FIG. 1, previously described in part, is a block diagram that schematically illustrates a known MDPSK semi-coherent demodulator.

Semi-coherent demodulators generally use the amplitude information of the input signal $x_i$ to perform calculations. It should be understood that various symbols used in the Detailed Description may relate to a signal itself or to a signal used to transmit an angle or other value.

A semi-coherent demodulator may be implemented in hardware, such as an Application-Specific Integrated Circuit (ASIC), or in software. The software may run on a Digital Signal Processor (DSP) or other processor. The implementation of the semi-coherent demodulator may depend on design choices and/or constraints of a manufacturer or communication product. The semi-coherent demodulator, as shown in FIG. 1, requires various phase-to-complex and complex-to-phase conversions to be performed, thereby increasing complexity. The semi-coherent demodulator 100 may be implemented in a receiver portion 10 of a wireless communication device 20.

Referring now to FIG. 2, a phase-domain semi-coherent demodulator 200 is illustrated. A decision $\phi_i^{200}$ from a decision unit 210 is subtracted from a phase component $\theta_i^{200}$ of an input signal $x_i$ at a phase sum adder 212. In the phase-domain semi-coherent demodulator 200, an output of the phase sum adder 212, a rotated input phase $\xi_i^{200}$, is not converted into a complex signal. Instead, the rotated input phase $\xi_i^{200}$ is input to a phase sum adder 230. The phase sum adder 230 subtracts a delayed reference phase $\psi_{i-1}^{100}$ from the rotated input phase $\xi_i^{200}$ in order to obtain a resulting signal 200. Rewriting Equation 3 in the phase domain yields the following equation:

$$\psi_i^{200} = \text{phase}(r_i) \qquad (7)$$

$$\psi_i^{200} = \text{phase}(\alpha * e^{j\psi_{i-1}} + (1-\alpha) * e^{j\xi_i})$$

$$\psi_i^{200} = \text{phase}(e^{j\psi_{i-1}}(\alpha + (1-\alpha) * e^{j(\xi_i - \psi_{i-1})}))$$

$$\psi_i^{200} = \psi_{i-1}^{200} + \arctan\left(\frac{(1-\alpha)*\sin(\zeta_i)}{\alpha + (1-\alpha)*\cos(\zeta_i)}\right)$$

$$\psi_i^{200} = \psi_{i-1}^{200} + \vartheta_i^{200}$$

Simplification of Equation 7 shows that the reference phase $\psi_i^{200}$ at instant i may be obtained by adding an update value $\vartheta_i^{200}$ to the delayed reference phase $\psi_{i-1}^{200}$ without the need for calculations in the complex domain. Thus, complex calculations that would require additional processing and larger silicon area as well as consume additional power are avoided.

The update value $\vartheta_i^{200}$ is a zero-mean stochastic variable, that is bounded to the ranges $[-\pi/2,\pi/2],[-\pi/4,\pi/4]$, and $[-\pi/8,\pi/8]$ for M=2, 4, and 8, respectively. The update value $\vartheta_i^{200}$ may be relatively small, thereby allowing a simplification in the calculation of the update value $\vartheta_i^{200}$. The simplification is based on the following equation:

$$\vartheta_i^{200} = c_1 * \zeta_i^{200} + c_2 * (\zeta_i^{200})^2 + c_3 * (\zeta_i^{200})^3 \ldots \quad (8)$$

$$c_1 = 1 - \alpha \text{ with}$$

$$c_2 = \frac{1}{6}\alpha - \frac{1}{2}\alpha^2 + \frac{1}{3}\alpha^3$$

$$c_3 = -\frac{1}{120}\alpha + \frac{1}{8}\alpha^2 - \frac{5}{12}\alpha^3 + \frac{1}{2}\alpha^4 - \frac{1}{5}\alpha^5$$

$\vartheta_i^{200}$ may be approximated by the first three terms of the series expansion shown in Eqn. (8). A coherency parameter $\alpha$, as shown in Equation 8, is determined for a particular system associated with the phase domain semi-coherent demodulator 200.

To further simplify the phase-domain semi-coherent demodulator 200, the third order equation with coefficients $c_1$, $c_2$, and $c_3$ may be reduced to a first-order equation without significant loss of performance. The first-order approximation allows a scaler 232 to be utilized to scale the instantaneous error signal $\zeta_i^{200}$ by the coefficient $c_1$. The output of the scaler 232 is the update value $\vartheta_i^{200}$ as described by Equation 8. A phase sum adder 234 adds the update value $\vartheta_i^{200}$ to the delayed reference phase $\psi_{i-1}$ in order to output the reference phase $\psi_i^{200}$. If the implementation of scaling is simple compared to phase addition, another addition may be removed at the cost of an additional scaling operation. This may be seen by the following equation:

$$c_1 * (\xi_i^{200} - \psi_{i-1}^{200}) + \psi_{i-1}^{200} = c_1 * \xi_i^{200} + (1-c_1) * \psi_{i-1}^{200} \quad (9)$$

The reference phase $\psi_i^{200}$ is delayed by a unit delay 218 to form a delayed reference phase $\psi_{i-1}^{200}$. The delayed reference phase $\psi_{i-1}^{200}$ is utilized in further calculations. A phase sum adder 220 subtracts the delayed reference phase $\psi_{i-1}^{200}$ from the phase component $\theta_i^{200}$. The output of the phase sum adder 220 is received by the decision unit 210 and a phase sum adder 224.

The decision unit 210 forms the decision $\phi_i^{200}$, which is delayed by a unit delay 222 to form the delayed decision $\phi_{i-1}^{200}$. The phase sum adder 224 subtracts the delayed decision $\phi_{i-1}^{200}$ from the output of the phase sum adder 220. The output of the phase sum adder 224 is an output $y_i^{200}$ of the phase-domain semi-coherent demodulator 200. The delayed decision $\phi_{i-1}^{200}$ is subtracted from the decision $\phi_i^{200}$ at a phase sum adder 226 to produce a decision of the output $D(y_i^{200})$. The decision $D(y_i^{200})$ is input to a look-up table (LUT) 228 to output detected bits.

FIG. 3 is a flow diagram illustrating a method 300 of calculating the reference phase $\psi_i^{200}$ in the phase domain. The flow 300 begins at step 302. At step 302, the delayed reference signal $\psi_{i-1}^{200}$ is subtracted from the rotated input phase $\xi_i^{200}$ to obtain the instantaneous error signal $\zeta_i^{200}$. The instantaneous error signal $\zeta_i^{200}$ is scaled by the coefficient $c_1$ to form the update value $\vartheta_i^{200}$ at step 304. At step 306, the update value $\vartheta_i^{200}$ is added to the delayed reference signal $\psi_{i-1}^{200}$ to form the reference phase $\psi_i^{200}$. The reference signal $\psi_i^{200}$ may be utilized in various calculations and decisions in order to attain the output $y_i^{200}$ of the phase domain semi-coherent demodulator 200 and to produce the decision of the output $D(y_i^{200})$ as noted above.

Although in the description above one scaler 232 to scale the instantaneous error signal $\zeta_i^{200}$ has been shown, various additional scalers may be employed in this invention to form higher-order approximations to yield better results. However, to obtain more accurate results, there is by necessity a trade off in increased complexity.

Embodiments of the present invention may be implemented in, for example, integrated circuits or chip sets, wireless systems, and receiver system products. For example, a computer is operative to execute software adapted to perform the demodulation techniques of the present invention. Demodulation software is adapted to reside on a computer readable medium, such as a magnetic disk within a disk drive unit. The computer readable medium may also include a flash memory card, EEROM based memory, bubble memory storage, ROM storage, etc. The software adapted to perform the demodulation method may also reside, in whole or in part, in the static or dynamic main memories or in firmware within a processor (i.e. within microcontroller, microprocessor or microcomputer internal memory). The demodulation method may also be applicable to implementations in integrated circuits, field programmable gate arrays (FPGAs), chip sets or application specific integrated circuits (ASICs), wireless systems, and other communication system products.

While exemplary embodiment(s) of the present invention have been described, it should be recognized that the invention can be varied in many ways without departing therefrom. Because the invention can be varied in numerous ways, it should be understood that the invention should be limited only insofar as is required by the scope of the following claims.

What is claimed is:

1. A phase-domain semi-coherent demodulator comprising: a receiver for receiving at least a phase component of an input signal; a decision unit for forming a decision value based on a delayed reference signal and the phase component of the input signal; a first phase sum adder for subtracting the decision value from the phase component of the input signal to form a rotated input phase; a second phase sum adder for subtracting the delayed reference signal from the rotated input phase to form an instantaneous error signal; a scaler for scaling the instantaneous error signal to form an update signal; and a third phase sum adder for adding the update signal to the delayed reference signal to form a reference signal.

2. The phase domain semi-coherent demodulator of claim 1, further comprising a unit delay for delaying the reference signal.

3. The phase domain semi-coherent demodulator of claim 1, further comprising a fourth phase sum adder for subtracting the delayed reference signal from the phase component of the input signal.

4. The phase domain semi-coherent demodulator of claim 3, further comprising a fifth phase sum adder for subtracting a delayed decision from information received from the fourth phase sum adder to form an output of the phase-domain semi-coherent demodulator.

5. The phase domain semi-coherent demodulator of claim 4, further comprising a second unit delay for forming the delayed decision.

6. The phase domain semi-coherent demodulator of claim 3, further comprising a sixth phase sum adder for subtracting a delayed decision from the decision of the decision unit to form a decision of the output.

7. The phase domain semi-coherent demodulator of claim 6, further comprising a look-up-table for outputting detected bits based on the decision of the output.

8. The phase domain semi-coherent demodulator of claim 1, wherein the phase-domain semi-coherent demodulator is implemented in a wireless access device.

9. The phase domain semi-coherent demodulator of claim 1, wherein the phase-domain semi-coherent demodulator is implemented in a device operable to communicate via a short-range wireless signal.

10. A method for calculating information in the phase domain for a semi-coherent demodulator, the method comprising: receiving at least a phase component of an input signal; forming, by a decision unit, of a decision value based on a delayed reference signal and the phase component of the input signal; subtracting the decision value from the phase component of the input signal to form a rotated input phase; subtracting the delayed reference signal from the rotated input phase to form an instantaneous error signal; scaling the instantaneous error signal to form an update signal; and adding the update signal to the delayed reference signal to form a reference signal.

11. The method of claim 10, further comprising the step of subtracting, by a phase sum adder, the delayed reference signal from the phase component of the input signal.

12. The method of claim 10, further comprising the step of subtracting a delayed decision from information received from the phase sum adder to form an output of the phase domain semi-coherent demodulator.

13. The method of claim 10, further comprising the step of subtracting a delayed decision from the decision of the decision unit to form a decision of the output.

14. The method of claim 12, further comprising the step of outputting detected bits based on the decision of the output.

15. An article of manufacture for phase-domain semi-coherent demodulation of an input signal, the article of manufacture comprising: at least one computer readable medium, processor instruction contained on the at least one computer readable medium, the processor instructions configured to be readable from the at least one computer readable medium by at least one processor and thereby cause the at least one processor to operate as to: receive at least a phase component of an input signal; form, by a decision unit, a decision value based on a delayed reference signal and the phase component of the input signal; subtract the decision value from the phase component of the input signal to form a rotated input phase; subtract the delayed reference signal from the rotated input phase to form an instantaneous error signal; scale the instantaneous error signal to form an update signal; and add the update signal to the delayed reference signal to form a reference signal.

16. A method of calculating information in the phase domain for a semi-coherent demodulator, the method comprising:

calculating an update value based on a series expansion, wherein said step of calculating an update value further comprises the steps of:

forming, by a decision unit, of a decision value based on a delayed reference signal and the phase component of an input signal;

subtracting the decision value from the phase component of the input signal in order to form a rotated input phase;

subtracting the delayed reference signal from the rotated input phase in order to form an instantaneous error signal; and scaling the instantaneous error signal to form an update signal and calculating a reference phase by adding the update value to a previous reference phase.

* * * * *

UNITED STATES PATENT AND TRADEMARK OFFICE
CERTIFICATE OF CORRECTION

PATENT NO. : 7,245,672 B2
APPLICATION NO. : 10/459604
DATED : July 17, 2007
INVENTOR(S) : Smit It is certified that error appears in the above-identified patent and that said Letters Patent is hereby corrected as shown below:

In Column 1, Line 54, delete "$\psi^{i100}$" and insert -- $\psi_i^{100}$ --, therefor.

In Column 1, Line 61, delete "$\xi^{i100}$" and insert -- $\xi_i^{100}$ --, therefor.

In Column 2, Line 8, delete "$u^{i100}$" and insert -- $u_i^{100}$ --, therefor.

In Column 2, Line 31, delete "$\psi^{i-1\ 100}$" and insert -- $\psi_{i-1}^{100}$ --, therefor.

In Column 4, Line 47, delete "200" and insert -- $\xi_i^{200}$ --, therefor.

Signed and Sealed this

Second Day of September, 2008

JON W. DUDAS
*Director of the United States Patent and Trademark Office*